May 26, 1931. LE ROY A. WESTMAN ET AL 1,807,362
HYDRAULIC SHOCK ABSORBER
Filed Jan. 19, 1929   2 Sheets-Sheet 1
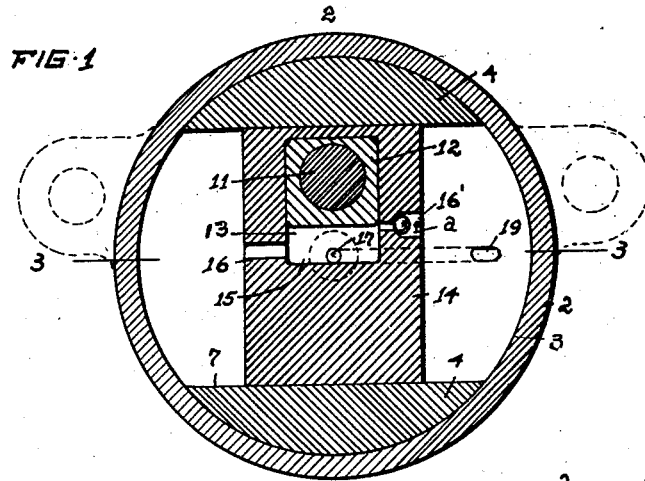
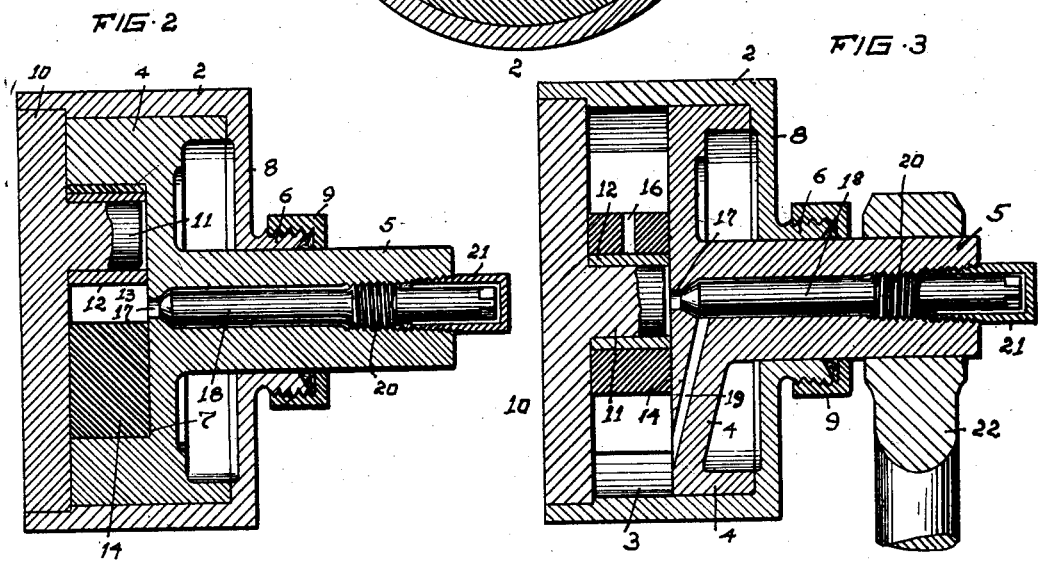
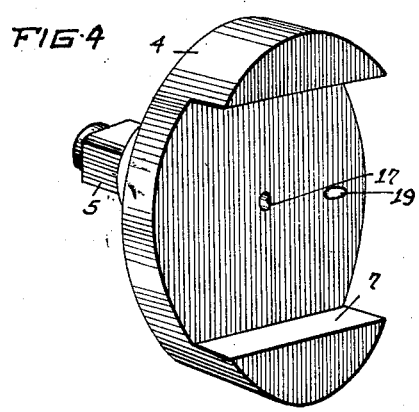
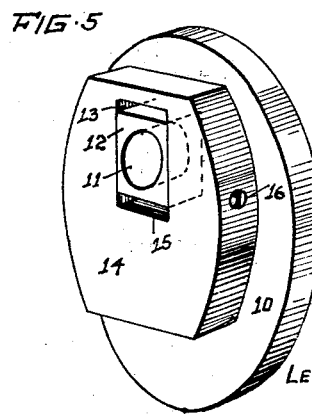
INVENTOR
GLENN B. CARMAN
LE ROY A. WESTMAN
Fisher, Moser & Moore
ATTORNEY

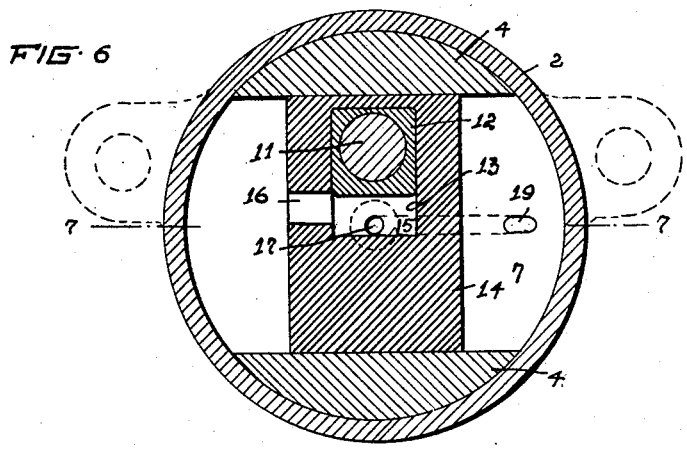
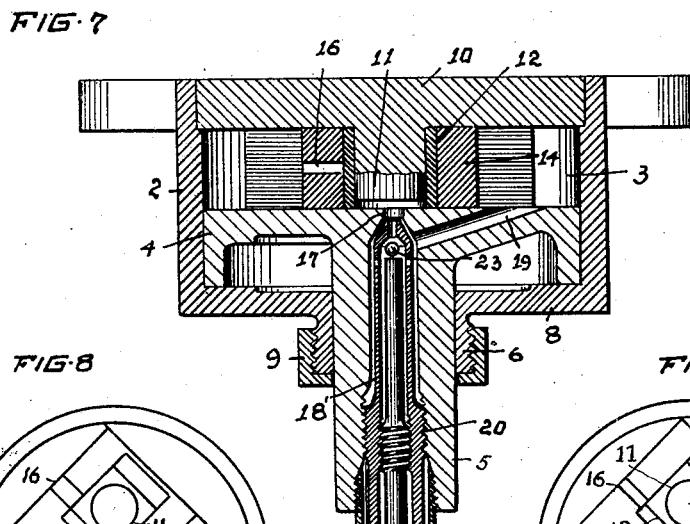
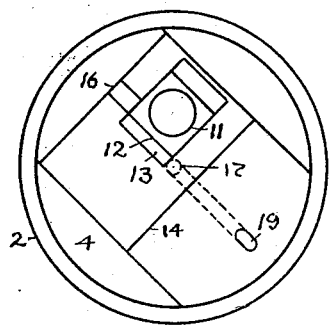
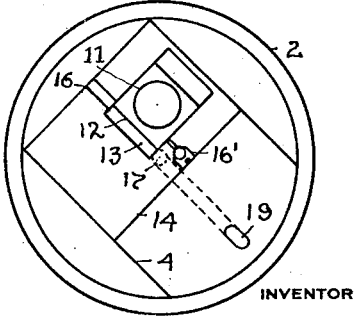

Patented May 26, 1931

1,807,362

UNITED STATES PATENT OFFICE

LE ROY A. WESTMAN AND GLENN B. CARMAN, OF CLEVELAND, OHIO

HYDRAULIC SHOCK ABSORBER

Application filed January 19, 1929. Serial No. 333,661.

Our invention relates to hydraulic shock absorbers for spring supported vehicles, and the present invention is an improvement in the shock absorber shown and described in our co-pending application, Ser. No. 333,660 filed Jan. 19, 1929. Thus, the present structure is simplified to facilitate the manufacture thereof, to permit convenient assembly and adjustment of the parts, to regulate and control the flow of the liquid by relative movements between the parts, and to effect transfer of the liquid through the moving parts.

In the accompanying drawings, Fig. 1 is a sectional view vertically through the device showing the working parts thereof in a neutral position. Fig. 2 is a sectional view taken on line 2—2 of Fig. 1, vertically in the plane of the axis of the device. Fig. 3 is a sectional view of the device on horizontal line 3—3 of Fig. 1. Fig. 4 is a perspective view of the channeled disk or oscillatory member. Fig. 5 is a perspective view of the piston pivotally connected to the rear plate. Fig. 6 is a sectional view corresponding to Fig. 1, but showing a modified form of the invention. Fig. 7 is a sectional view in plan of the modified device, taken on line 7—7 of Fig. 6. Fig. 8 is a diagrammatic view of the device shown in Fig. 6, with the disk and piston rotated to an angle of approximately 45°, and Fig. 9 is a similar view of the parts in the device of Fig. 1 turned to the same angle.

The present invention comprises a casing 2 containing a circular chamber 3 within which a disk 4 is adapted to be oscillated or rotated in opposite directions. An operating shaft 5 for disk 4 extends through a bearing portion 6 on front wall 8 of the casing, and a packing ring or nut 9 is screw-connected with the bearing portion to seal the joint. The rear or opposite side of casing 2 is closed by a plate 10 welded or affixed to the wall of the casing in any suitable way, and disk 4 is formed with a straight guide-way or channel 7 diametrically across the same opposite plate 10. A round post or stud shaft 11 on plate 10 extends into the groove or channel 7 on the vertical median line of the casing above the axis of the disk or in offset or eccentric relation thereto. A square block or flat sided piece 12 is sleeved pivotally upon post 11, and this block is confined within a rectangular slot 13 in a reciprocable plate or piston 14 which is seated within the guide-ways or channel 7 in the disk. Slot 13 extends at right angles to channel 7 toward and across the axis or center of the disk, and in turning the disk about its axis, piston 14 is also caused to rotate about the same axis and to slide in the direction of rotation. The piston slides lengthwise of the channel and the rotatable movement of the disk carries it at the same time toward the stationary post or stud shaft 11. That is, when the disk is turned the piston is shifted lengthwise within channel 7 and also moved or carried toward post 11 and block 12, thereby narrowing or reducing the space between block 12 and the inner end 15 of slot 13. The length of slot 12 may be greater or less, but as shown in the drawings, the slot is long enough to permit the disk to be rotated to no less than an angle of approximately 45°, as indicated in the diagrammatic views Figs. 8 and 9.

It being understood that relative movement occurs between piston 14 and pivot block 12 lengthwise of slot 13 during the turning movement of the disk, it will also be understood that the relatively movable parts may be utilized as slide valves to restrict or to cut off the flow of a liquid passing through slot 13. For example, in Fig. 1 the piston contains two ends ports 16—16', one of which is situated relatively near one corner of block 12 so that it may be gradually closed thereby during the initial movement of the piston. In Fig. 1 the port so controlled contains a ball or check valve —a— to permit the passage of liquid in one direction only. However, both ports communicate with slot 13 and an axial orifice or opening 17 in disk 4 where a tapering valve member 18 is employed to reduce the passage. From this point duct 19 extends through disk 4 to one end of channel 7, thereby establishing open communication at all times between the opposite ends of channel 7 so that the liquid may be transferred from one end chamber to the other by the reciprocable movements of piston 14. Moreover the liquid flows through the piston itself where it may be controlled or cut off partly or completely by using block 12 as a valve member during the rotative movement of disk 4. The liquid also flows through transfer ducts and passages where it may be restricted in a predetermined degree at orifice 17, utilizing the tapered valve stem 18 for that purpose, see Fig. 2, as hereinafter more fully explained.

Valve stem 18 extends through an axial bore in shaft 5 and has a screw-threaded body 20 engaged with screw-threads to effect longitudinal movement of the valve relatively to the tapered seat at orifice 17. The outer end of member 18 projects beyond the outer end of shaft 5 and has a wrench engaging extremity to facilitate rotation and permit adjustment thereof, and a screw-threaded cap or cover 21 encloses the wrench extremity and seals the opening or bore in the shaft. An arm or lever 22 is secured to the projecting end of shaft 5 wherewith the shaft and disk may be rotated or oscillated. This arm is linked or coupled to the vehicle axle or spring, and the casing 2 is bolted to the frame of the vehicle according to known or customary practices, whereby shaft 5 will be oscillated whenever the vehicle spring is flexed.

In operation, when the vehicle spring is under its normal load, it is partly compressed and under tension. The working parts of the shock absorber device, in this condition of the vehicle spring, are in a central or substantially neutral position, for example, as delineated in Fig. 1. Therefore, a movement of the vehicle body or spring vertically in either direction will rotate the disk and shift the piston within its channel, thereby displacing the liquid opposite one end of the piston and transferring it through the ducts and passages to the opposite end of the piston. The initial movement is free until block 12 cuts off port 16', and then the entire flow of the liquid is through orifice 17. Thereafter the movement of the vehicle spring is controlled in fixed and predetermined degree by the restriction in flow of the liquid at orifice 17 by valve member 18. Abnormal movements of the vehicle spring or the vehicle body will increase however the rotative movement of the disk, and thereby produce a greater relative movement between piston 14 and pivot block 12, thus causing the piston to cut off port 16 or orifice 17 in greater or lesser degree dependent upon the degree of rotative movement imparted to disk 4. Accordingly, additional restriction in the flow of the liquid between the opposite end of the piston is produced, thus checking or dampening the movement additionally proportionate to the increased throw or movement of the vehicle body or vehicle spring. To promote that purpose the position of the ports in the piston, or the size or shape of the ports, may be be changed to meet any given need or requirement, and the present showing merely exemplifies one operating arrangement which may be used.

Another form of the invention is shown in Figs. 6 and 7, the modification being chiefly in the valve means for controlling the flow of the liquid through orifice 17. In this case valve member 18' is tubular and contains a ball or check valve 23 in one end opposite an axial end opening and lateral openings which permit the liquid to flow freely through orifice 17 into and through the tube. A screw-threaded stem extends through this tube to either limit the movement of ball 23 or to seat the ball to close the end opening in the tube. In this form of the invention the liquid passes freely in one direction through the axial end opening past the ball, but is reduced in flow when passing in the opposite direction to and through the tapered seat, inasmuch as the check valve will seat itself and close the end opening under the latter condition. Therefore this shock absorber may be readily adjusted and set to act with increased checking or dampening effect in one direction than in the other, or the ball 23 may be held to its seat to restrict the flow of the liquid equally in opposite directions. Port 16 in piston 14 in this instance is so positioned in respect to block 12 that the flow of liquid through this port will be restricted additionally and gradually in increasing degree during the rotative movements of the disk, although the size of this port and its position in respect to block 12 may be changed from that shown in the drawings to modify the results.

What we claim, is:

1. A shock absorber, including a liquid chamber, a rotatable disk within said chamber and axially aligned therewith, an eccentric device, and a liquid displacement piston operatively connected with said disk and said eccentric device, said piston having a liquid transfer passage associated with said device to restrain in varying degree the flow of liquid displaced by the piston.

2. A shock absorber, including a chamber containing a liquid, a transversely channeled disk rotatably mounted within said chamber, a piston slidably mounted in the channel of said disk and at opposite ends openly exposed to the liquid within the channel of said disk, means for reciprocating said piston upon rotating said disk in opposite directions, said disk and piston having transfer passages for the liquid adapted to be opened and closed by said means to effect restriction in flow of the liquid during a part of the stroke of the piston.

3. A shock absorber, including a liquid chamber, a channeled disk rotatably mounted within said chamber, a reciprocable piston mounted to slide within said channeled disk, an eccentric device co-acting with said disk to reciprocate said piston, a liquid transfer passage extending through the piston in communication with the opposite ends of the channel in said disk, and means for restricting the flow of a liquid in at least one direction through said passage.

4. A shock absorber, including a liquid casing, a rotatable member within said chamber, a reciprocable piston carried by said rotatable member, a pivot block for said piston located off-center in respect to the axis of said rotatable member, and a liquid transfer passage within said piston adapted to be closed by said block to restrict the flow of liquid displaced by the piston.

5. A shock absorber, including a liquid chamber, a rotatable disk and piston for displacing a liquid confined within said chamber, said piston being supported to slide diametrically across said disk, an eccentric post and a pivot block sleeved thereon and slidably engaged by said piston, and a liquid transfer passage having a port adapted to be closed by said block for checking the displacement of liquid by the movements of said disk and piston.

6. A shock absorber, including a chamber, a channeled disk and a slotted piston adapted to rotate together within said chamber, an eccentric post having a pivot block in slidable engagement with said slotted piston, a liquid passage adapted to be cut off by said block during the reciprocable movements of said piston, and adjustable means for restricting the flow of liquid through said passages.

7. A shock absorber, comprising a casing containing a rotatable disk and piston, an eccentric device for translating the rotary movement of the piston into a reciprocable movement, communicating passages in said disk, and piston, permitting the transfer of a liquid from one end of the piston to the other during rotatable movements of the disk, and the reciprocable movement of said piston being adapted to cut off said passages with valve effect to control the said transfer of liquid.

8. A shock absorber, including a casing a rotatable disk within said casing and axially aligned therewith, a liquid displacement piston, eccentric means co-acting with said disk for reciprocating said piston, said piston and eccentric means co-acting as valve members to gradually restrict the amount of liquid displaced by a part of the stroke of the piston.

9. A shock absorber, including a circular chamber, a rotatable disk channeled across its face, a piston adapted to slide within said channeled disk, means for reciprocating said piston by oscillating said disk, communicating passages in said piston and disk to permit the transfer of a liquid from one end of the channel to the other during oscillatory movements of the disk, and means for restricting the flow of liquid through said passages.

10. A shock absorber, including a transversely channeled rotatable disk, a liquid displacing piston carried in the channel of said disk, eccentric means opposite said disk and co-acting therewith for reciprocating said piston, a liquid transfer port axially of said disk, and a valve member axially of the disk opposite said port for restraining the flow of liquid and the movements of said parts.

11. A shock absorber, including a channeled rotatable disk having an operating shaft, a reciprocable piston within the channel of said disk, eccentric means co-acting with said disk to operate said piston, a liquid-passage within said disk extending into the open channeled portion close to one end thereof and having a port axially of the disk, and an adjustable liquid-flow-restraining device extending through said shaft opposite said port.

12. A shock absorber, including a reciprocable piston having a liquid transfer passage therein, means including a rotatable channeled disk for supporting and operating said piston, a liquid transfer passage centrally of said disk in communication with said first passage, and an adjustable valve member containing a check valve for controlling the flow of liquid through said passages.

In testimony whereof we affix our signatures.

GLENN B. CARMAN.
LE ROY A. WESTMAN.